Dec. 27, 1966 MITSUO MATSUSHIMA ET AL 3,295,055
COMBINED UNIT OF IMPEDANCE
Filed April 17, 1962 2 Sheets-Sheet 1
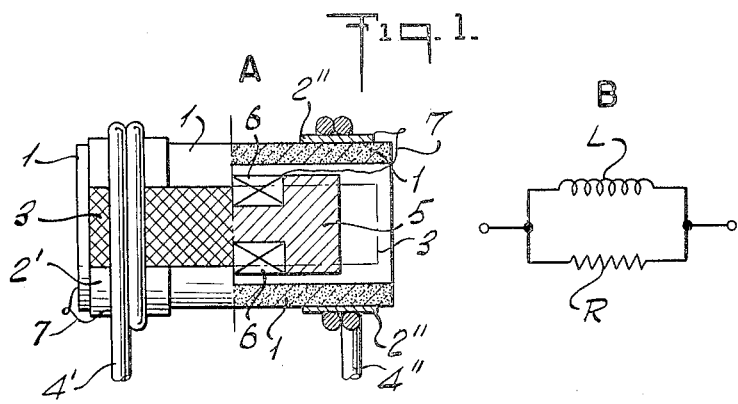
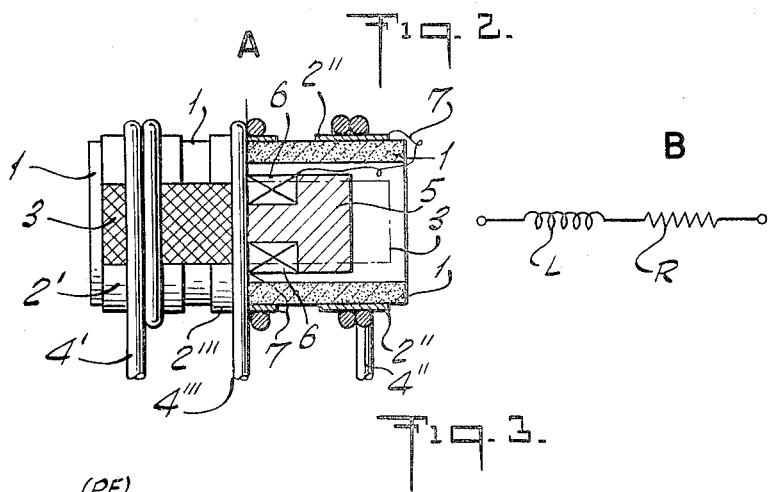
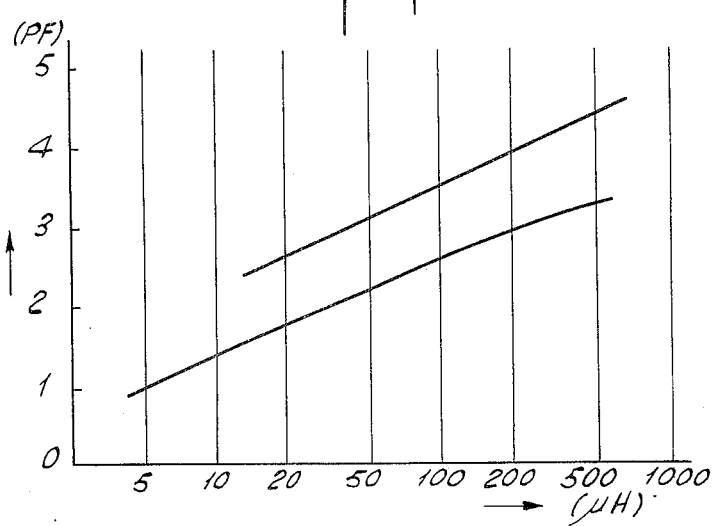
INVENTORS
MITSUO MATSUSHIMA &
SHIGEAKI OGAWA
BY Blum, Moscovitz,
Friedman and Blum
ATTORNEYS United States Patent Office 3,295,055
Patented Dec. 27, 1966

3,295,055
COMBINED UNIT OF IMPEDANCE
Mitsuo Matsushima and Shigeaki Ogawa, both of Akita-ken, Japan, assignors to Tokyo Denki Kagaku Kogyo Kabushiki Kaisha, Tokyo, Japan
Filed Apr. 17, 1962, Ser. No. 188,173
Claims priority, application Japan, Apr. 20, 1961, 36/19,457, 36/19,458
3 Claims. (Cl. 323—74)

This invention relates to a compact impedance unit combining inductance with either resistance or capacitance, all in a simple compact unit.

In one form of the invention, the impedance unit comprises a combination of inductance and resistance, particularly an inductive winding and a Q-damping resistor, the winding being usable as the peaking coil or winding for the wide-band amplification circuit of a television receiving set or the like.

In another form of the invention, the impedance unit comprises an inductive winding and one or more condensers or capacitors. In this form of the invention, the impedance unit is suitable for use as the detecting filter or the like of communication equipment in general, and particularly as the detecting filter or the like of a radio or television set.

Basically, the impedance unit of the invention includes a tubular body of dielectric material, such as porcelain, on which there are at least a pair of axially spaced bands of electrically conductive low resistance metal, these bands being on the external surface of the body and each having a terminal lead electrically connected thereto as by tight wrapping of the lead therearound. A ferrite core is positioned within the tubular body, and preferably is formed with a peripheral recess. A winding is provided on this core, as by being seated in the peripheral recess, and the opposite ends of the winding are electrically connected to respective ones of the metal bands.

In the form of the invention involving an inductance and a resistance, a high resistance material, such as a film of carbon or the like, is provided on the external surface of the body and electrically interconnects the bands. Two bands are used in the event that it is desired to have a parallel connection of the inductance and the resistance and, in such case, one end of the winding is electrically connected to one band and the opposite end of the winding is electrically connected to the opposite bands. In the event it is desired to have a series connected inductance and resistance, a third or intermediate band is provided, and one end of the winding is connected to one end band and the other end of the winding is connected to the intermediate band.

In the form of the invention involving an inductance and a capacitance, three bands are provided on the exterior surface of the body, and one band is continued as a coating or the like on the internal surface of the body. This forms two condensers having one electrode in common. In this form of the invention, the opposite ends of the winding are preferably connected to those two bands which are applied only to the external surface of the body, and a unit is thus provided in which the winding is connected between two terminals and each condenser is connected between a respective one of such two terminals and the third terminal.

For an understanding of the principles of the invention, reference is made to the following description of typical embodiments thereof as illustrated in the accompanying drawings. In the drawings:

FIG. 1, part A, is a side elevational view, partly in axial section, of one form of impedance unit embodying the invention;

FIG. 1, part B, is a schematic wiring diagram of the equivalent circuit of the unit shown in FIG. 1A;

FIG. 2, part A, is a side elevational view, partly in axial section, of a modification of the unit shown in FIG. 1A;

FIG. 2, part B, is a schematic wiring diagram of the equivalent circuit of the unit shown in FIG. 2A;

FIG. 3 is a graph illustrating the distributed capacity of the impedance unit embodying the invention;

Figure 4:
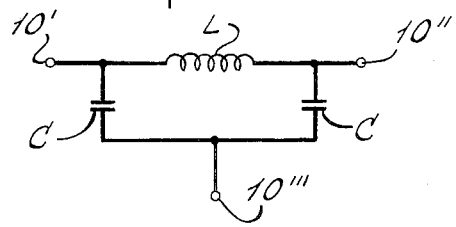
FIG. 4 is a schematic wiring diagram of the equivalent circuit of the impedance unit shown in FIGS. 5 and 6.

As shown in parts A of FIGURES 1 and 2, metallic electrodes 2' and 2", in the form of bands of silver or the like, are fixed to the outside ends of the tubular cylindrical insulator, or dielectric body 1. A high electrical resistance material 3, such as a film of carbon or the like, is provided on the external surface of body 1. Leads 4', 4" and 4"' are wound around and secured to the said electrodes to provide a means of connection.

A combined unit, shown in parts B of each figure, and which consists of a resistor and a winding can be obtained by inserting and securing a ferrite magnetic core 5, which is provided with a winding 6 in a peripheral recess therein, inside the cylindrical insulator 1, and connecting the winding ends or lead wires 7 to the metallic electrodes of silver or the like.

In the event that the impedance unit of the invention is to provide a combination of inductance and resistance connected in parallel with each other, and which is shown in the equivalent circuit of part B of FIGURE 1, the winding lead wires may be connected with the said silver electrodes 2' and 2" as is shown in part A of FIGURE 1. Similarly, in the case that the device of this invention is to be used as a combination resistance and inductance unit with the resistance and the inductance connected in series, as shown in part B of FIG. 2, this can be effected by applying a third metallic band or electrode 2"' of silver or the like, and identical with the electrodes 2' and 2". In this case, one end of the winding, which in the embodiment of FIG. 1 has been connected with the electrode or band 2', is now connected with the electrode or band 2"' as shown in part A of FIG. 2. The other coil winding lead 7 remains connected to electrode 2" which is in turn connected to terminal lead 4", thus providing a series arrangement as shown schematically in FIG. 2B.

It is known to provide peaking coils in which the winding element is connected either in parallel or in series with the resistance element. However, in the present invention the inductive element, comprising the ferrite core 5 and the winding 6, is positioned within the interior of the resistor. Thus, the whole unit is made very compact, in addition to which the inductance unit is protected from damage by external impacts and the like. As the winding is connected to the resistance either in parallel or in series, the number of connected parts can be reduced, thus resulting in an increase in the working efficiency.

Moreover, the ferrite magnetic core, such as used in the present invention, results in the distributed capacity being substantially reduced as compared with that of a conventional air-core winding. This is graphically illustrated in FIG. 3, in which the upper curve represents the distributed capacity of a conventional air-core coil and the lower curve represents the distributed capacity of the inductance unit in accordance with the invention. It is thus seen that for an inductor unit having a given inductance, the distributed capacitance of such inductor unit will be less when the inductor unit is constructed in accordance with the present invention than a conventional inductor having the same inductance. For example, a conventional inductor having an inductance of 50 microhenries would typically have a distributed capacitance of approximately 3 picofarads whereas an inductor in accordance with the present invention having the same inductance of 50 microhenries would only have a distributed capacitance of approximately 2 picofarads. The measurements resulting in the graph of FIG. 3 are based on the following:

Measuring instrument _____ Booton Q-meter, type 260–AP.
Frequency ratio _____ $n=2$.
Temperature and humidity _____ 20° C., 50%.

Figure 5:
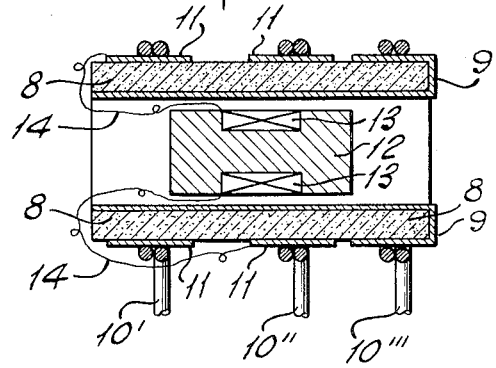
FIGS. 5 and 6 are axial sectional views through alternative embodiments of the impedance unit as arranged to provide combined inductance and capacitance.
Figure 6:
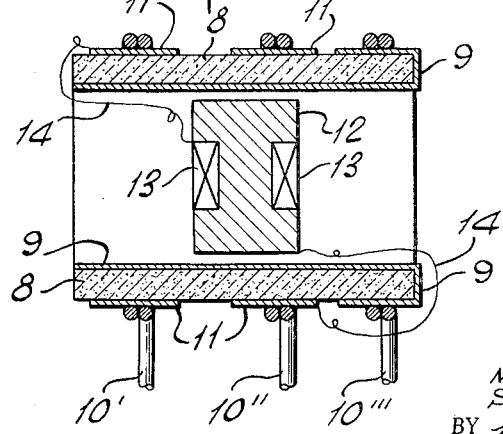

As shown in FIGURES 5 and 6, the inside and the outside surfaces of the cylindrical porcelain or tubular dielectric body, 8, having a high-dielectric constant, are coated with bands of silver or the like to make these bands the internal electrode 9 and the external electrodes 11 respectively, to which the leads are secured by wrapping therearound. That is, the lead terminals 10' and 10" are securely fixed to the external electrodes 11, and the lead terminal 10''' is securely fixed to the internal electrode 9, which is a continuous coating of silver or the like extending to the exterior. Thus two condensers can be obtained as is shown in the equivalent circuit diagram of FIGURE 4.

The magnetic coil core, which is provided with the winding 13 in the peripheral recess at the center of the drum-shaped ferrite magnetic core 12, is then inserted into and securely fixed to the interior of the tubular dielectric body 8 by means of an insulating paint or a binding agent, and thus a combined unit of the equivalent circuit of connection can be obtained as shown in FIGURE 4 by connecting the lead wires 14 of the winding with lead terminals 10' and 10" of the above-mentioned condenser(s).

The size of the parts is made extremely compact by using the device like this, because the coil core is fixed to the internal space of the said condenser, which is made of one-piece porcelain dielectric. For example, in case of $f=100$ kc./s., $L=45$ $\mu$h., and $C=10$ $\mu$f., the said condenser can be made in size of 8 mm. x 14 mm. The coil core is usually fixed as is shown in FIGURE 5. However, when it is fixed as shown in FIGURE 6, the external form of the combined unit becomes larger, though the leakage magnetic flux becomes smaller and the Q becomes higher.

As the combined unit, moreover, is limited to have three load terminals, these three points may merely be connected when it is installed into the equipment, thus raising the working efficiency.

Because the coil core is, in addition, inserted into the cylindrical porcelain, troubles of disconnection or short-circuit or the like due to external impact are avoided, and because of using ferrite material for the core winding, it has an advantage that the distributed capacity is about 1$\mu$f. smaller than that of a conventional air-core winding.

What we claim is:

1. A compact impedance unit comprising, in combination, a tubular body of dielectric material; at least a pair of axially spaced bands of electrically conductive low resistance metal on the outer surface of said body; terminal leads each electrically connected to a respective band; a layer of high electrical resistance material on the outer surface of said body and electrically interconnecting said bands; a ferrite core positioned within said body; and a winding on said core having its opposite ends electrically connected to respective bands; said core and said winding constituting an inductive impedance component; and said bands, in combination with said layer of high electrical resistance material, constituting a resistive impedance component.

2. A compact impedance unit, as claimed in claim 1, in which there are two of said bands; said winding being electrically connected between said bands whereby to provide an impedance unit comprising a resistance and an inductance connected in parallel.

3. A compact impedance unit, as claimed in claim 1, in which there are three of said bands, including two end bands and an intermediate band; said winding being connected between one end band and the intermediate band whereby to provide an impedance unit comprising a series connected inductance and resistance.

References Cited by the Examiner

UNITED STATES PATENTS

| | | | |
|---|---|---|---|
| 1,792,375 | 2/1931 | Jakosky | 336—177 |
| 2,166,359 | 7/1939 | Lakatos | 323—77 X |
| 2,323,376 | 7/1943 | Harvey | 336—136 |
| 2,403,349 | 7/1946 | Dolberg | 323—76 X |
| 2,626,317 | 1/1953 | Malm | 336—233 |
| 2,626,318 | 1/1953 | Torre | 336—233 |
| 2,630,560 | 3/1953 | Earl et al. | 336—233 |
| 2,724,091 | 11/1955 | Klapperich | 336—136 |
| 2,724,761 | 11/1955 | Cisne | 323—74 X |

FOREIGN PATENTS 671,764  10/1963  Canada.

JOHN F. COUCH, *Primary Examiner.*
LLOYD McCOLLUM, MILTON O. HIRSHFIELD,
*Examiners.*
A. D. PELLINEN, *Assistant Examiner.*